Patented July 21, 1931

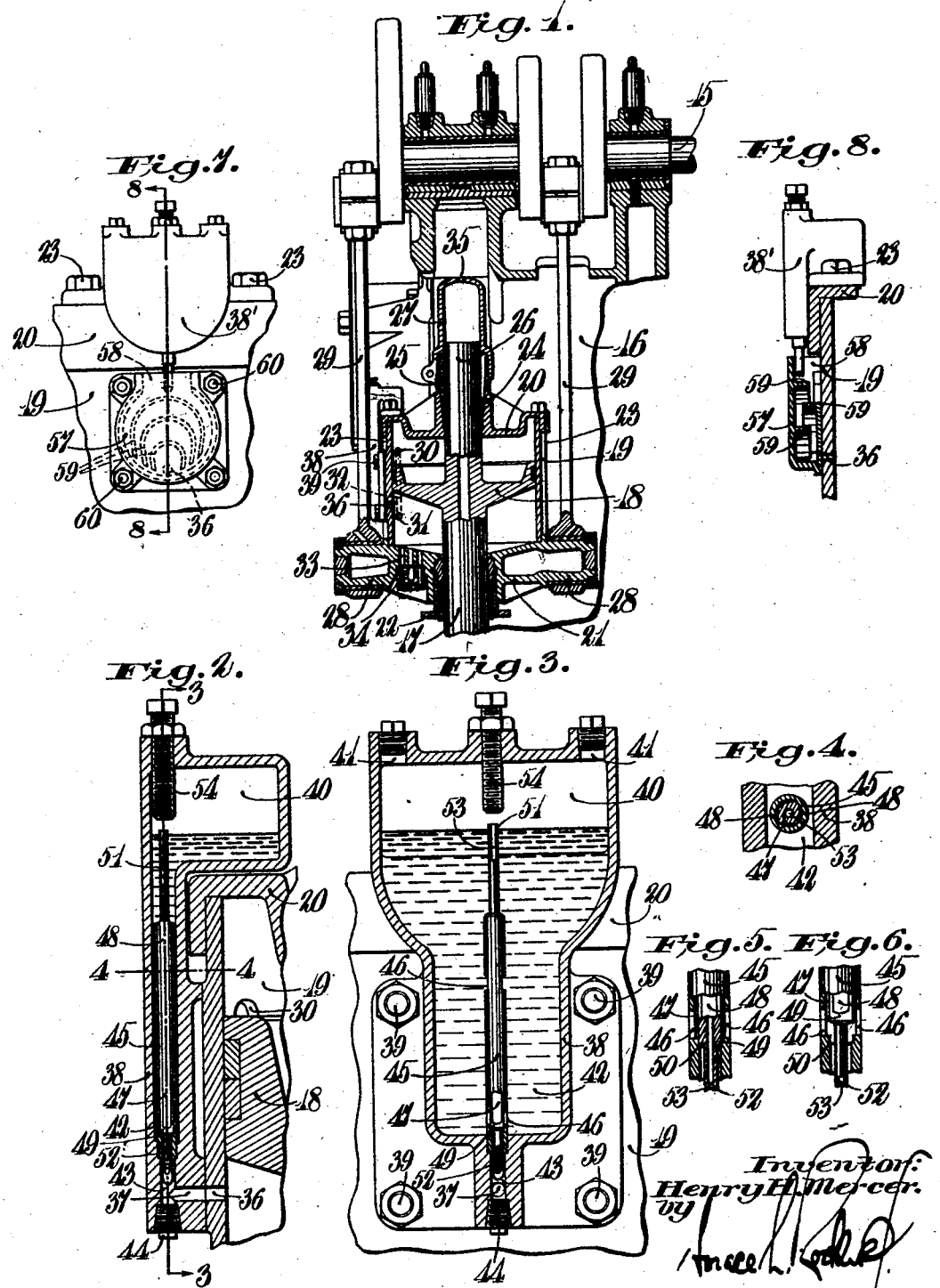

1,815,111

UNITED STATES PATENT OFFICE

HENRY H. MERCER, OF CLAREMONT, NEW HAMPSHIRE, ASSIGNOR TO SULLIVAN MACHINERY COMPANY, A CORPORATION OF MASSACHUSETTS

LUBRICATOR

Application filed June 13, 1921. Serial No. 477,039.

This invention relates to lubricators, and has for its general object to provide means applicable to a reciprocating part, and operated by the inertia or momentum which is overcome at each reversal of the direction of movement of said part, for supplying thereto a measured quantity of lubricant. In its more specific aspect, the invention contemplates the provision of improved lubricating means for the cylinder and piston employed in connection with certain types of percussive tools, and particularly in stone channeling machines, for operatively connecting the driving motor and tool, and for providing an elastic yielding medium between said parts which will convert the rotary movement of the crank shaft of the motor into such a movement of the tool as will cause the latter to perform its cutting function in the most efficient manner.

The foregoing and other objects of the invention, together with means whereby the same may be carried into effect, will best be understood from the following description of certain forms or embodiments thereof illustrated in the accompanying drawings, in which:

Fig. 1 is a vertical section of a portion of a channeling machine head having the invention applied thereto.

Fig. 2 is an enlarged vertical section of the lubricating device and a portion of the cylinder to which it is attached.

Fig. 3 is a vertical section taken substantially on the line 3—3 of Fig. 2 with parts shown in elevation.

Fig. 4 is a still further enlarged detail section on the line 4—4 of Fig. 2.

Figs. 5 and 6 are fragmentary detail views illustrating the operation of the lubricant feed member.

Fig. 7 is a side elevation of the lubricator, illustrating a modification.

Fig. 8 is a section on the line 8—8 of Fig. 7, the lubricator being shown in elevation.

For convenience, the invention is herein illustrated as applied to a stone channeling machine having the usual tool carrying cross head (not shown) which is reciprocated through suitable connections from a crank shaft 15 suitably journaled in the machine head 16. In machines of the type illustrated herein, the cross head is connected to a piston rod 17 secured to or formed integral with a piston 18 working in a cylinder 19 which is guided for vertical reciprocation in the head 16. The cylinder 19 as shown is provided with upper and lower heads 20 and 21 between which is interposed the cylinder shell, said heads being connected by tie rods 23. The piston rod 17 passes through the lower head 21, which may be provided with a suitable stuffing box 22. The upper cylinder head 20 is formed with a tubular extension 24 containing a bushing 25 in which is guided a piston rod extension 26 projecting upwardly from the piston 18, the upper end of said extension being preferably closed by a tubular cap 27. The lower cylinder head 21 is shown as provided with self-lubricating wrist pins 28 connected by rods or pitmen 29 with the crank shaft 15.

The remaining parts of the channeling machine to which the invention is applied, being well known in the art, are not shown herein, as said machine is merely illustrative of one type of machine in connection with which the invention may be used. For the purpose of the present description, and in accordance with the broader aspect of the invention it is necessary only that the latter be applied to a reciprocating part, of which the cylinder 19 and piston 18, for operatively connecting a channeling tool or gang of channeling tools with the actuating crank shaft therefor, constitute a typical example.

The wall of the cylinder 19 is shown as provided intermediate its ends with a pair of longitudinally spaced ports 30 and 31 connected by a longitudinally extending by-pass 32. The lower cylinder head 21 is provided with an inlet port or ports 33 controlled by an inwardly opening check valve 34. The bushing 25 is provided with a longitudinally extending groove connecting the upper end of the cylinder with the interior of the cap 27, the latter being provided at its top with a small outlet port 35.

The parts last referred to, although, in accordance with one feature of the invention, entering into combination with the lubricant supplying means hereinafter described, specifically, or aside from such combination, form no part of the present invention, being covered by the claims of my prior application for Letters Patent, filed June 27, 1918, Ser. No. 242,261 now Patent No. 1,500,599, July 8, 1924. For purposes of the present description, however, it may be stated that reciprocation of the cylinder 19 causes the piston 18 and the parts connected therewith to be given a series of resilient impulses, the piston moving more or less in the cylinder, so that, at each reciprocation of the parts, a greater or less amount of air passes from the lower end of the cylinder to the upper end thereof through the by-pass 32. This loss of air from the lower end of the cylinder is compensated for by the admission of air through the check valve 34, while the excess air at the upper end of the cylinder is gradually discharged through the groove in the bushing 25 and the outlet opening 35. While, in the operation of the machine, the air will, to a certain extent, surge back and forth through the by-pass 32, there is a general tendency, due to the operation of the check valve 34, for the resultant movement of the air to be upward from the inlet 33 to the outlet 35.

In addition to the openings 30 and 31, the wall of the cylinder 19 is provided intermediate its ends with an opening or port 36 by which lubricant is supplied to the interior of said cylinder, a portion of said lubricant gravitating downwardly in said cylinder to the piston rod 17, so as to lubricate the same, and another portion of said lubricant, due to the upward flow of air in the cylinder as above explained, being carried upwardly with said air in order to lubricate the piston rod extension 26. In accordance with the present invention, the means for supplying lubricant to the opening 36, in such a manner as to produce a substantially steady flow thereof through the mechanism, are substantially as follows:

In the construction shown in Figs. 1 to 6, the port or opening 36 communicates with a port 37 in a casing 38 secured to the cylinder 19 by bolts 39. The casing 38 is formed at its upper end to constitute a lubricant receptacle 40 provided with suitable filling openings 41 and having a flat, downwardly extending portion 42 from the bottom of which leads a passage 43 communicating with the port 37 and closed at its lower end by a suitable plug 44. Seated at its lower end in a counterbored portion of the upper end of the passage 43 is an upright supply tube 45 having one or more ports 46 through which the interior of said tube communicates with the interior of the lubricant reservoir extension 42. Guided for longitudinal vertical movement in the tube 45 is a plunger 47 of sufficient mass to cause the same to be reciprocated by inertia in the tube 45 when the cylinder 19 and casing 38 are reciprocated in the normal operation of the machine. The plunger 47 is formed with flattened surfaces 48 (Fig. 4) to permit passage of lubricant thereby through the tube 45, and the lower end 49 thereof constitutes a valve which cooperates with a valve seat 50 formed in the interior of the tube 45 at a short distance below the lowermost port or group of ports 46. The plunger 47 is formed with upwardly and downwardly extending stems or extensions 51 and 52 extending respectively to a point above the level of the lubricant in the receptacle 40 and to a point adjacent the lower end of the tube 45, and with a longitudinal bore 53 extending to the ends of said extensions through which fluid pressure is adapted to flow to the lubricant receptacle and thereby exert a pressure on the surface of the lubricant. This pressure is substantially constant, irrespective of the fluctuation of the pressure in the cylinder and port 36, due to the relatively great length of the restricted bore 53 within the stem. Upward movement of the plunger 47 is limited by engagement of the upper end of the extension 51 with a stop screw 54 carried by the top of the lubricant receptacle, said stop screw being adjustable to vary the range of reciprocation of said plunger.

In operation, when the cylinder 19 moves downwardly, the inertia of the plunger 47 causes the latter to move upwardly in the tube 45 until its movement is checked by engagement of the upper end of the hollow stem 51 with the stop screw 54. Lubricant is forced by the pressure in the receptacle 40 to the interior of the tube 45 through the port or ports 46 and is thereafter caused to flow downwardly through said tube to the passage 43 and port 37, whence it finds its way through the port 36 to the interior of the cylinder. This downward flow is made positive by the fact that upon upward movement of the cylinder 19, the plunger 48 will move downwardly, thereby giving an impulse to the lubricant and positively feeding the same downwardly until the lower end 49 thereof is brought into engagement with the valve seat 50, thereby shutting off further flow of lubricant. As the cylinder 19 is rapidly reciprocated, lubricant is thus fed, a drop or two at a time, to the port 36 the amount fed at each complete reciprocation of the cylinder 19 being controlled by adjustment of the stop screw 54.

In the form of the invention shown in Figs. 7 and 8 the casing 38', corresponding to the casing 38, is secured by the tie rods 23 to the cylinder 19 and the mechanism carried by said casing may be substantially as in the form of the invention first described, but in this form of the invention, the lubricant instead of being fed from said casing directly to the port 36 in the wall of the cylinder 19, is delivered to a receptacle 57 secured, as by bolts 60, to said cylinder wall and having an open top 58, said receptacle as herein shown, being of the form disclosed and claimed in my prior application, Ser. No. 242,261 now Patent No. 1,500,599, July 8, 1924, above referred to. Within the receptacle 57 is a vertical series of curved, downwardly concave baffle plates 59, each of said plates having depending ends extending substantially to the bottom of said receptacle. The several baffle plates 59 are disposed in staggered relationship, alternate plates being carried by the inner and outer walls respectively of the receptacle, and the free edges of the adjacent plates overlapping one another.

In the operation of this form of the invention, the fluid pressure in that portion of the cylinder with which the port 36 communicates, due to the relative reciprocation of the cylinder and piston, fluctuates through a considerable range, being at times less and at other times greater than atmospheric. A current of air is therefore set up in the receptacle 57 and through the port 36, the direction of said current being at times inward and at other times outward. Said air, due to the baffle plates 59, passes through the receptacle 57 in a zigzag path between the opening 36 and the open top 58. The lubricant supplied to said receptacle by the lubricant feeding means above described, tends to gravitate to the bottom of said receptacle, a certain quantity of said lubricant passing with the air through the port 36 into the interior of the cylinder when the flow of said air is inward. When, however, air is forced outwardly from the cylinder through the port 36 and passes upwardly through the receptacle 57, the particles of liquid lubricant carried thereby will impinge upon and be arrested by the baffle plates 59 and will be conducted by the depending ends of said baffle plates back to the lower part of the receptacle.

While I have in this specification shown and described certain embodiments which my invention may assume in practice and one use to which said invention may be put, it will be understood that the particular constructions and adaptation described and shown have been chosen for illustrative purposes merely, and that the invention may be otherwise embodied and used without departing from its spirit or the scope of the claims hereunto appended. The term "reciprocating" is herein used in its broadest sense and is not to be taken as limited to rectilinear motion but is to be understood as including oscillatory and other motion whose direction is periodically changed or reversed.

What I claim as new and desire to secure by Letters Patent is:—

1. The combination with a cylinder and a piston therein having a piston rod, of inertia operated means for supplying lubricant to the interior of said cylinder, said cylinder having provision for maintaining a flow of gaseous fluid therein from said lubricant supplying means to said piston rod.

2. The combination with a reciprocating member, of a lubricator therefor carried thereby, said lubricator comprising a lubricant supply tube and a plunger guided for reciprocating movement in said supply tube, said plunger having flattened portions to permit passage of lubricant thereby through said supply tube.

3. The combination with a reciprocating member, of a lubricator therefor comprising a lubricant receptacle carried by said member, a supply tube leading from said receptacle, a reciprocating plunger in said supply tube, and a stem carried by said plunger and extending above the surface of the lubricant in said receptacle, said plunger and stem having a passage therethrough to vent said receptacle.

4. The combination with a reciprocating member, of a lubricator therefor comprising a lubricant supply tube carried by said member and having lateral ports, an inertia reciprocated plunger in said supply tube, said plunger having a stem extending beyond said supply tube, and a stop engaged by said stem for limiting the movement of said plunger.

5. The combination with a reciprocating member, of a lubricator therefor comprising a lubricant receptacle carried by said member, a supply tube leading from said receptacle and having a valve seat therein, and an inertia reciprocated plunger member in said supply tube for positively forcing lubricant from the latter and having an end constituting a valve cooperating with said valve seat, said plunger having passage means formed therein for supplying fluid pressure to said receptacle.

6. In a channeling machine, the combination with a tool reciprocating means, a lubricant receptacle carried thereby, a tube carried in said receptacle, ports in said tube, and inertia operated means cooperating with said tube to pump lubricant from said ports.

7. In combination, a reciprocating member having a chamber subject to fluctuating pressures, means controlled by inertia to pump lubricant to said reciprocating means comprising an oiling receptacle carried thereby, a hollow stem carried in said receptacle having passage means formed therein and forming a pump cylinder, and a plunger slidably mounted in said stem for controlling said passage means and cooperating with said cylinder for positively pumping lubricant from said receptacle.

8. In combination, a reciprocating cylinder, an oil receptacle carried thereby, a hollow ported stem carried by said receptacle, a plunger carried in said hollow ported stem, a counterbore in said stem below said ports, said plunger having a portion adapted to move into and out of said counterbore on reciprocation of said cylinder to force oil admitted through said ports into said hollow stem.

9. In combination, a reciprocating member, a lubricant receptacle carried thereby and having an outlet for lubricant, a tube mounted in said outlet extending into and communicating with said chamber, a hollow plunger in said tube communicating at one end with said outlet, and at the other end with said chamber above the normal level of lubricant, said plunger having an intermediate portion fitting into a bore of the tube and adapted on reciprocation of said member to move into said bore to force lubricant therein into said outlet.

10. In combination, a cylinder, a lubricator attached thereto adapted to function by reciprocatory movements of said cylinder, said lubricator comprising a reservoir, an outlet therefore communicating with said cylinder and said reservoir, a plunger movable in said outlet by the influence of its own inertia and having a portion fitting said bore to force lubricant therefrom into said outlet, a second portion extending a substantial distance into said outlet beyond said first portion, and a third portion extending upwardly above the normal level of lubricant, said plunger having a passage therethrough to equalize the pressure in said reservoir and the lower part of the outlet.

11. In a channeling machine, the combination with a tool reciprocating means, a lubricant receptacle carried thereby, a tube carried in said receptacle and having an open end terminating therein, ports in said tube, and means cooperating with said tube to pump lubricant from said ports.

12. In a channeling machine, the combination with a tool reciprocating means, a lubricant receptacle carried thereby, a tube carried in said receptacle and having an open end terminating therein, ports in said tube, and means cooperating with said tube and projecting through the open end thereof freely into said receptacle whereby lubricant may be pumped from said receptacle through said ports.

In testimony whereof I affix my signature.

HENRY H. MERCER.